US012600173B2

(12) United States Patent (10) Patent No.: US 12,600,173 B2
Prou et al. (45) Date of Patent: Apr. 14, 2026

(54) NOISE IMPROVING TREAD

(71) Applicant: Compagnie Generale Des Etablissements Michelin, Clermont-Ferrand (FR)

(72) Inventors: Joris Prou, Tokyo (JP); Alexandre Enderlin, Tokyo (JP)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 246 days.

(21) Appl. No.: 17/786,882

(22) PCT Filed: Dec. 24, 2019

(86) PCT No.: PCT/JP2019/050468
§ 371 (c)(1),
(2) Date: Jun. 17, 2022

(87) PCT Pub. No.: WO2021/130833
PCT Pub. Date: Jul. 1, 2021

(65) Prior Publication Data
US 2023/0015465 A1    Jan. 19, 2023

(51) Int. Cl.
*B60C 11/03* (2006.01)
*B60C 11/00* (2006.01)
*B60C 11/12* (2006.01)

(52) U.S. Cl.
CPC ........ *B60C 11/032* (2013.01); *B60C 11/0008* (2013.01); *B60C 2011/0025* (2013.01); *B60C 2011/0033* (2013.01)

(58) Field of Classification Search
CPC ............... B60C 11/032; B60C 11/0008; B60C 2011/0025; B60C 2011/0033; B60C 11/1281; B60C 11/0323; B60C 2011/0348
See application file for complete search history.

(56) References Cited

U.S. PATENT DOCUMENTS 5,388,625 A    2/1995  White
2003/0201048 A1* 10/2003  Radulescu .......... B60C 11/1218
152/209.25
(Continued)

FOREIGN PATENT DOCUMENTS

FR          3041568 A1 *  3/2017  ........... B60C 11/033
JP          05178027 A  *  7/1993
(Continued)

OTHER PUBLICATIONS

Bruneau, English Machine Translation of FR 3041568, 2017 (Year: 2017).*

(Continued)

*Primary Examiner* — Katelyn W Smith
*Assistant Examiner* — Brendon Charles Darby
(74) *Attorney, Agent, or Firm* — Dickinson Wright PLLC

(57) ABSTRACT

The tread has a contact face that is provided with at least one circumferential groove and a transverse grooves opening to the contact face and delimiting contact elements. The tread has a center region and shoulder regions and is provided with at least one compressive contact element among the contact elements. A volumetric void ratio of the compressive contact element in a unit region surrounded by a center of the at least one circumferential groove and a center of the transverse grooves delimiting the compressive contact element is at least equal to 25%. An aspect ratio, which is defined as a ratio of a surface of the compressive contact element supposed to contact with ground divided by a sum of a surface area of the compressive contact element touching with air other than the surface of the compressive contact element supposed to contact with ground, is at most 70%.

9 Claims, 3 Drawing Sheets

(56)                    References Cited

U.S. PATENT DOCUMENTS

| | | | | |
|---|---|---|---|---|
| 2004/0261926 A1* | 12/2004 | Ozel | .................... | B60C 11/005 |
| | | | | 152/209.5 |
| 2012/0024442 A1* | 2/2012 | Narita | .................. | B60C 11/032 |
| | | | | 152/209.18 |
| 2013/0213542 A1* | 8/2013 | Warfford | ................ | B60C 11/12 |
| | | | | 152/209.1 |
| 2014/0299242 A1 | 10/2014 | Chauvin | | |

FOREIGN PATENT DOCUMENTS

| | | | | | |
|---|---|---|---|---|---|
| JP | 2010260405 A | * | 11/2010 | | |
| JP | 2013159275 A | | 8/2013 | | |
| WO | WO-2019102148 A1 | * | 5/2019 | ......... | B60C 11/0304 |

OTHER PUBLICATIONS

Hasegawa, English Machine Translation of JP 2010260405, 2010 (Year: 2010).*
Muhlhoff, English Machine Translation of WO 2019102148, 2019 (Year: 2019).*
Obara, English Machine Translation of JP H05178027, 1993 (Year: 1993).*

* cited by examiner

[Fig. 1]
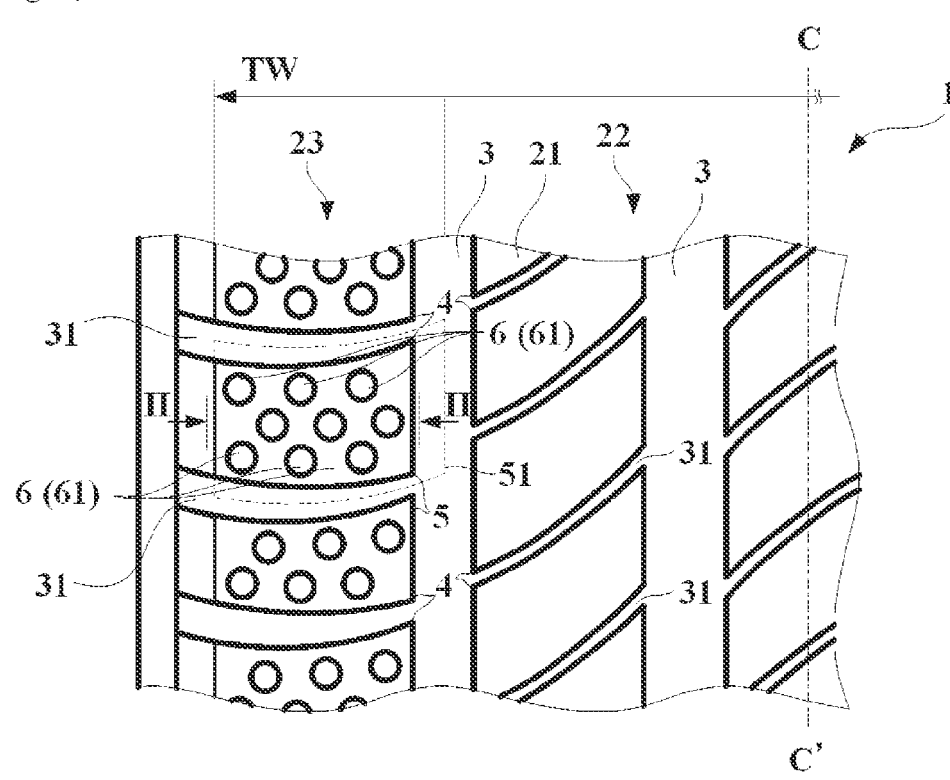
[Fig. 2]
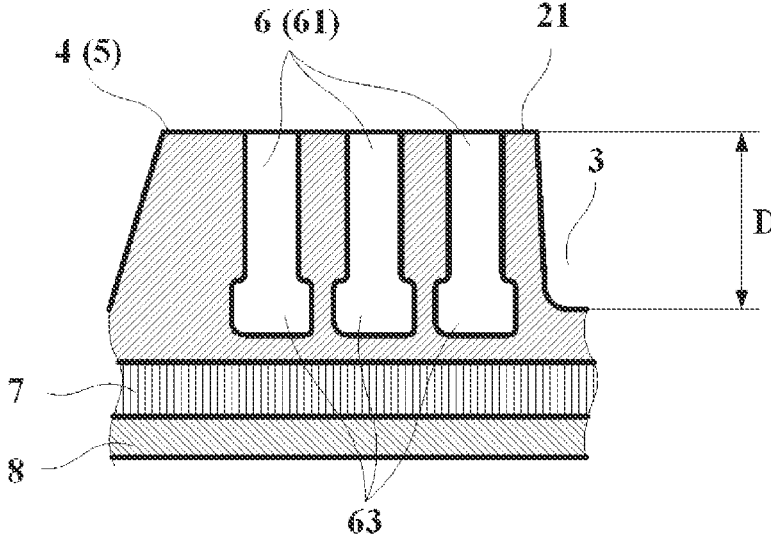

[Fig. 3]
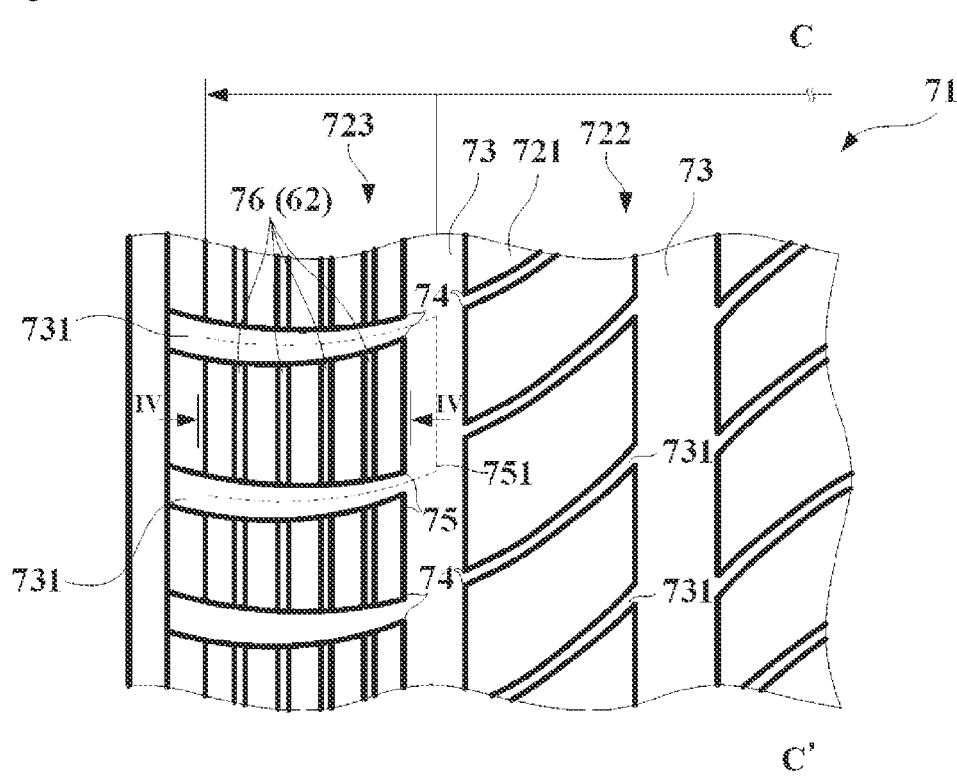
[Fig. 4]
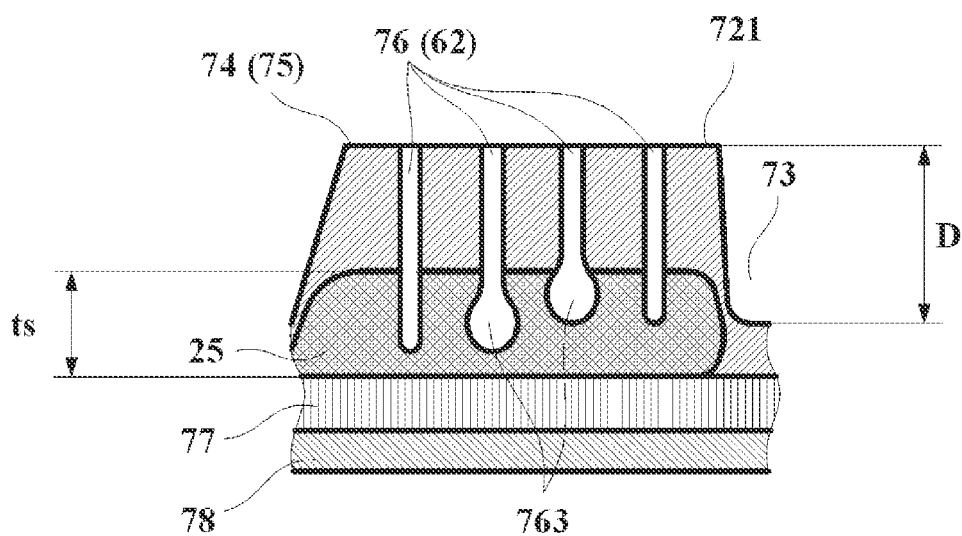

[Fig. 5]
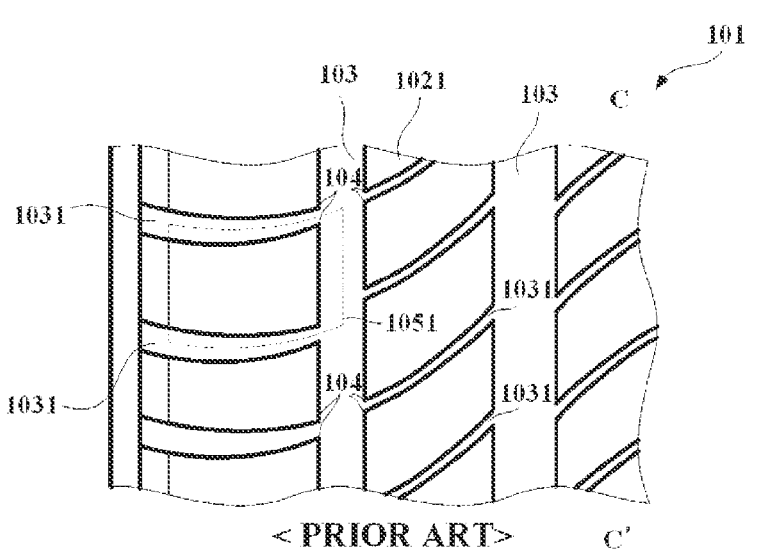
< PRIOR ART>
[Fig. 6]
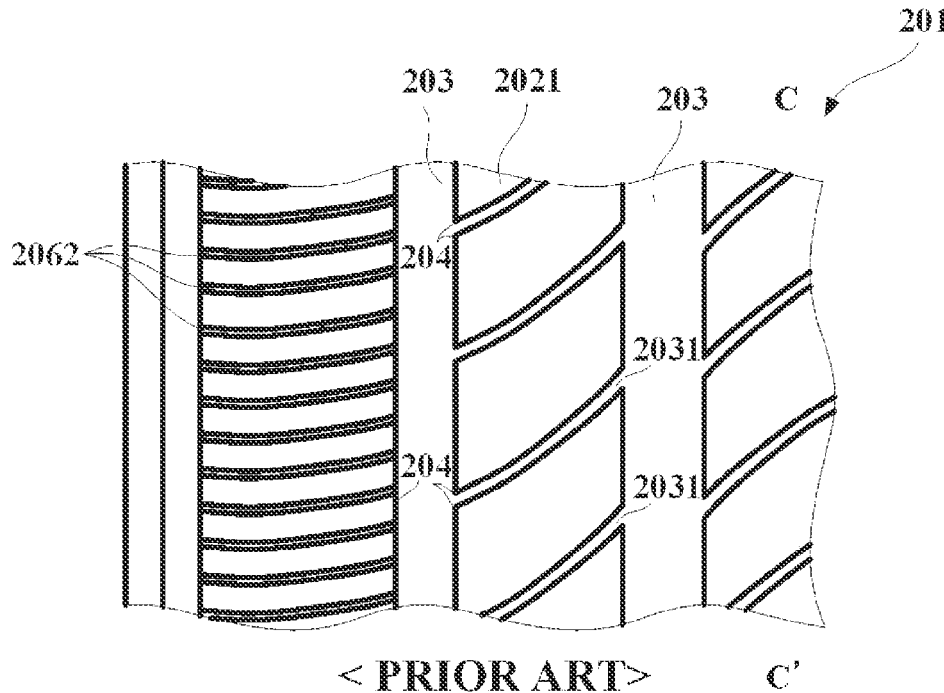
< PRIOR ART>

NOISE IMPROVING TREAD

CROSS-REFERENCE TO RELATED APPLICATION

This application claims priority to and the benefit of PCT Patent Application No. PCT/JP2019/050468 filed on 24 Dec. 2019, entitled "A NOISE IMPROVING TREAD."

BACKGROUND

1. Technical Field

The present disclosure relates to a tread for a tire, in particular to a tread for a tire provides improvement on noise performance.

2. Background Art

In recent years, premiumisation and quality improvement of vehicles lead, from the view point of occupant's comfort and environmental considerations in particular toward an electrification of a vehicle, desire to various noise reductions.

It is known that the noise from the tires includes various components, that is a component from external noise and a component from internal noise. The internal noise includes a vibration due to excitation of a tread portion during rolling, the vibration is transmitted to a wheel rim, an axis, a suspension and a body of the vehicle then heard in an interior of the vehicle as noise.

In order to improve such noise, it is known that reduction of the vibration due to excitation of the tread portion by placing relatively soft rubber in the tread is effective. Various solutions have been proposed to improve such noise.

EP0827845 discloses a tire having a reduced rigidity rubber component interposed between a tread layer and a belt reinforcement, the reduced rigidity rubber component having a hardness and a geometry such that the maximum longitudinal and lateral contact stresses on the tread layer are reduced relative to a tire without such reduced rigidity rubber component.

WO2012119844 discloses a pneumatic vehicle tire having a tread which is comprised in the radial direction of two layers consisting of different rubber compounds, a tread cap and a tread base, and the tread base viewed in the axial direction has at least directed radially outward, a central segment and two lateral segments, the two lateral segments consist of a rubber compound that has a lower dynamic elastic modulus E' at 55° C. and a lower hysteresis than the central segment of the tread base for a lower rolling resistance without worsening the handling behavior.

JP2000198319 discloses a pneumatic tire having a tread portion in a two-layered structure of a cap tread layer and an under tread layer, the under tread layer is constituted by a center region and a shoulder region extended continuously from the center region to an outer, the regions comprising rubber composition different from each other, the center region is arranged with a rubber layer where JIS-A hardness is from 65 to 80, the shoulder region is arranged with a rubber layer where JIS-A hardness is from 50 to 70.

JP2009286317 discloses a tire having two layers tread, a base rubber and a cap rubber, the base rubber is divided into a center base rubber segment located at the widthwise center and shoulder base rubber segments located on both sides outside the center base rubber segment in the width direction, a dynamic modulus of the elasticity (E') of the center base rubber segment is 8.0 to 18.0 at 30° C., the dynamic modulus of the elasticity (E') of the shoulder base rubber segments is 3.0 to 7.0 at 30° C.

EP2632744 discloses a multi-stage tire tread having two or more wear layers comprising an outer wear layer and one or more inner wear layers arranged within the thickness of the tread below the outer wear layer. One or more outer grooves are arranged within the outer wear layer, while one or more inner grooves arranged within at least one of the one or more inner wear layers, the tread further includes a volumetric void ratio equal to approximately 0.25 to 0.40 in the unworn condition and approximately 0.25 to 0.40 in a worn condition where the outer, ground-engaging side is arranged along one of the inner wear layers in the worn condition, the tread further having a contact surface ratio equal to approximately 0.66-0.72 in the unworn condition and approximately 0.56-0.66 in the worn condition for providing improved worn tire performance, especially in wet or snow conditions, without sacrificing new tire performance.

JP2018034728 discloses a pneumatic tire including a tread portion including an inboard tread region between a tire equator and an inboard tread edge, and an outboard tread region between the tire equator and an outboard tread edge, the inboard tread region is provided with a first main groove extending and a second main groove each extending continuously in the tire circumferential direction, the outboard tread region is provided with a plurality of recesses that are not in communication with other grooves, the recesses include a plurality of deep bottom recesses having depths equal to or more than 5 mm, a total of opening areas of the deep bottom recesses on a ground contact surface of the tread portion is equal to or less than 5% of a surface area of the outboard tread region that is obtained by filling up all grooves and recesses provided thereon for better dry performance, wet performance and wear resistance. JP2013159275 discloses a pneumatic tire is formed with a land segment. A tire inner cavity surface of a tread part is provided with a long sheet-like acoustic damper made of foamed material and extending in a tire peripheral direction. The land segment rim-assembled into a normal rim and having an acoustic damper overlapping segment M positioned outside of a tire radial direction of the acoustic damper at a tire meridian section including a tire rotary axis under a normal state where normal inner pressure is charged. The acoustic damper overlapping segment M is provided with dimples composed of small holes at a tread surface and/or side wall surfaces facing against sipes. U.S. Pat. No. 5,388,625 discloses a read for a tire having a mid-circumferential plane. The tread comprises a plurality of tread elements arranged in a circumferential array about the tire. The tread also comprises a plurality of transverse extending grooves. Each of the grooves separate a pair of circumferentially adjacent tread elements. An area moment of inertia is associated with each of the tread elements when viewed normal to the tread element. Each of the area moments of inertia have a respective pair of principle axes of inertia relative to the mid-circumferential plane. The angular orientation between any pair of principle axes of inertia of different tread elements is within a predetermined angular range of 40 degrees or less.

CITATION LIST

Patent Literature

PTL 1: EP0827845
PTL 2: WO2012119844

PTL 3: JP2000198319
PTL 4: JP2009286317
PTL 5: EP2632744
PTL 6: JP2018034728

However with the solutions disclosed in these documents, improvement on noise performance is not satisfactory especially due to incompressibility of rubber material. Also at the same time, degradation of handling performance is not an acceptable level. Thus there is a desire to further improvement of noise performance while maintaining reasonable level on handling performance. Therefore, there is a need for a tread for a tire which provides further improvement on noise performance while improving or maintaining reasonable level on handling performance.

Definitions

A "radial direction/orientation" is a direction/orientation perpendicular to axis of rotation of the tire. This direction/orientation corresponds to thickness orientation of the tread.

An "axial direction/orientation" is a direction/orientation parallel to axis of rotation of the tire.

A "circumferential direction/orientation" is a direction/orientation which is tangential to any circle centered on axis of rotation. This direction/orientation is perpendicular to both the axial direction/orientation and the radial direction/orientation.

A "tire" means all types of elastic tire whether or not subjected to an internal pressure.

A "tread" of a tire means a quantity of rubber material bounded by lateral surfaces and by two main surfaces one of which is intended to come into contact with ground when the tire is rolling.

A "groove" is a space between two rubber faces/sidewalls which do not contact between themselves under usual rolling condition connected by another rubber face/bottom. A groove has a width and a depth.

A "contact patch" is a footprint of a tire mounted onto its standard rim as identified in tire standards such as ETRTO, JATMA or TRA, and inflated at its nominal pressure and under its nominal load. A "width TW" of a contact face is a maximum contact width of the contact patch along with an axis of rotation of the tire.

A "shear storage modulus G'''" is a shear storage modulus measured at 23° C., 10 Hz and 10% of strain.

SUMMARY

It is thus an object of the disclosure to provide a tread for a tire which provides improvement on noise performance while maintaining reasonable level on handling performance.

The present disclosure provides a tread for a tire having a contact face of a width TW intended to come into contact with ground during rolling, the tread being provided with at least one circumferential groove of a depth D extending in circumferential orientation and a plurality of transvers grooves extending generally in axial orientation, both the at least one circumferential groove and the plurality of transvers grooves opening to the contact face, the at least one circumferential groove and the plurality of transverse grooves delimiting a plurality of contact elements, the tread comprising a center region and a pair of shoulder regions being positioned on two axial sides of the center region, the tread is provided with at least one compressive contact element among the plurality of contact elements, the compressive contact element comprises a plurality of compressive elements, a volumetric void ratio of the at least one compressive contact element in a unit region surrounded by a center of the at least one circumferential groove and a center of the plurality of transverse grooves delimiting the compressive contact element among the plurality of contact elements is at least equal to 25%, an aspect ratio defined as a ratio of a surface of the compressive contact element supposed to contact with ground divided by a sum of a surface area of the compressive contact element touching with air other than the surface of the compressive contact element supposed to contact with ground is at most equal to 70%.

This arrangement provides an improvement on noise performance while maintaining reasonable level on handling performance.

Since the tread is provided with at least one compressive contact element comprising the plurality of compressive elements among the plurality of contact elements, such the compressive contact element can absorb deformation due to Poisson's effect and limit stiffening due to incompressibility of rubber material constituting the tread thanks to the plurality of compressive elements. Therefore it is possible to improve noise performance.

Since the volumetric void ratio of the at least one compressive contact element in a unit region surrounded by a center of the at least one circumferential groove and a center of the plurality of transverse grooves delimiting the compressive contact element among the plurality of contact elements is at least equal to 25%, the compressive contact element can ensure enough void to absorb deformation due to Poisson's effect. Therefore it is possible to improve effectively noise performance.

If the volumetric void ratio of the at least one compressive contact element in the unit region is less than 25%, there is a risk that the compressive contact element cannot ensure enough void to absorb deformation due to Poisson's effect thus stiffening finally the contact element leading insufficient improvement on noise performance. By setting this volumetric void ratio of the at least one compressive contact element in the unit region at least equal to 25%, it is possible to improve effectively noise performance.

This volumetric void ratio of the at least one compressive contact element in the unit region is preferably at least equal to 28%, more preferably at least equal to 30%.

Since the aspect ratio defined as the ratio of the surface of the compressive contact element supposed to contact with ground divided by the sum of the surface area of the compressive contact element touching with air other than the surface of the compressive contact element supposed to contact with ground is at most equal to 70%, the compressive contact element can limit structural stiffening of the tread. Therefore it is possible to improve effectively noise performance.

If this aspect ratio is more than 70%, there is a risk that the compressive contact element cannot limit structural stiffening of the tread thus stiffening finally the contact element leading insufficient improvement on noise performance. By setting this aspect ratio at most equal to 70%, it is possible to improve effectively noise performance.

This aspect ratio is preferably at most equal to 60%, more preferably at most equal to 50% and still more preferably at most equal to 40%.

In another preferred embodiment, a width of one of the pair of shoulder regions between an axial extremity of the tread and the center of axially outermost circumferential groove closest to the axial extremity of the tread is from 10% to 25% of the width TW, the compressive contact element locates in at least one of the pair of shoulder regions.

If the width of one of the pair of shoulder regions is less than 10% of the width TW, there is a risk that a volume of the compressive contact element available on the tread becomes insufficient thus insufficient improvement on noise performance. If the width of one of the pair of shoulder regions is more than 25%, there is a risk that a volume of the compressive contact element available on the tread becomes too much thus degrading handling performance. By setting the width of one of the pair of shoulder regions between the axial extremity of the tread and the center of axially outermost circumferential groove closest to the axial extremity of the tread from 10% to 25% of the width TW and locating the compressive contact element in at least one of the pair of shoulder regions, it is possible to improve noise performance while maintaining reasonable level on handling performance.

In another preferred embodiment, an average of the volumetric void ratio of the plurality of contact elements including the compressive contact element at one of the pair of shoulder regions is at least equal to 25%, and an average of the aspect ratio of the plurality of contact elements including the compressive contact element at one of the pair of shoulder regions is at most equal to 70%.

According to this arrangement, it is possible to improve effectively noise performance while maintaining reasonable level on handling performance as one of the pair of shoulder regions can get maximum benefit of the compressive contact element available in the pair of shoulder regions.

In another preferred embodiment, all the contact elements in the pair of shoulder regions are the compressive contact element.

According to this arrangement, it is possible to improve efficiently noise performance while maintaining reasonable level on handling performance as shoulder regions can get full benefit of the compressive contact element available in the shoulder regions.

In another preferred embodiment, the plurality of compressive elements is a plurality of holes opening to the contact face and extending in radially inward of the tread.

According to this arrangement, it is possible to improve efficiently noise performance while maintaining reasonable level on handling performance as the holes can absorb efficiently deformation of the compressive contact element due to Poisson's effect.

In another preferred embodiment, the plurality of compressive elements is a plurality of incisions opening to the contact face and extending in an orientation having non-zero angle with axial orientation of the tread.

According to this arrangement, it is possible to improve noise performance in particular exterior noise performance as the incisions are not open directly to exterior of the tread.

In another preferred embodiment, at least one of the compressive element among the plurality of compressive elements comprises an enlarged portion at radially innermost portion of the compressive element.

According to this arrangement, it is possible to improve efficiently noise performance while maintaining reasonable level on handling performance as the enlarged portion can absorb efficiently deformation of the compressive contact element due to Poisson's effect.

In another preferred embodiment, radially innermost of the enlarged portion locates at a level below radially innermost of the groove.

According to this arrangement, it is possible to improve efficiently noise performance while maintaining reasonable level on handling performance as the enlarged portion can effectively support deformation of the compressive contact element.

In another preferred embodiment, the pair of shoulder regions each comprises a shoulder rubber layer of a thickness ts made of a shoulder rubber composition different from a rubber composition constituting the tread, and a shear storage modulus G' of the shoulder rubber composition is smaller than a shear storage modulus G' of the rubber composition constituting the tread.

According to this arrangement, it is possible to improve noise performance while maintaining reasonable level on handling performance since the shoulder rubber layer is comprised in the pair of shoulder regions and not the center region, degradation on handling performance is limited as the center region has a dominant impact on handling performance due to longer contact length compared to shoulder regions, and the shoulder rubber layer can effectively reduce excitation of the tread during rolling thanks to the shoulder rubber composition having the shear storage modulus G' smaller than the rubber composition constituting the tread.

In another preferred embodiment, the shear storage modulus G' of the shoulder rubber composition is less than or equal to 2.0 MPa.

If the shear storage modulus G' of the shoulder rubber composition is more than 2.0 MPa, there is a risk that an improvement on noise performance would be insufficient. By setting the shear storage modulus G' of the shoulder rubber composition less than or equal to 2.0 MPa, the shoulder rubber layer can effectively reduce excitation of the tread during rolling.

According to the arrangements described above, it is possible to provide a tread for a tire which provides further improvement on noise performance while maintaining reasonable level on handling performance.

BRIEF DESCRIPTION OF THE DRAWINGS

Other characteristics and advantages of the disclosure arise from the description made hereafter in reference to the annexed drawings which show, as nonrestrictive examples, the embodiment of the disclosure.

In these drawings:

FIG. 1 is a schematic plan view of a tread according to a first embodiment of the present disclosure;

FIG. 2 is a schematic cross sectional view taken along line II-II in FIG. 1;

FIG. 3 is a schematic plan view of a tread according to a second embodiment of the present disclosure;

FIG. 4 is a schematic cross sectional view taken along line IV-IV in FIG. 3;

FIG. 5 is a schematic plan view of a tread according to prior art; and

FIG. 6 is a schematic plan view of a tread according to another prior art.

DESCRIPTION OF EMBODIMENTS

Preferred embodiments of the present disclosure will be described below referring to the drawings.

A tread 1 for a tire according to a first embodiment of the present disclosure will be described referring to FIGS. 1 and 2.

FIG. 1 is a schematic plan view of a tread according to a first embodiment of the present disclosure. FIG. 2 is a schematic cross sectional view taken along line II-II in FIG. 1. The tread 1 shown in the FIG. 1 is a half of a portion of the tread divided with respect to a center line C-C' extending in circumferential orientation.

The tread 1 is a tread for a tire having dimension 235/45R18 and has a contact face 21 of a width TW intended to come into contact with ground during rolling, provided with at least one circumferential groove 3 of a depth D (shown in FIG. 2) extending in circumferential orientation and a plurality of transvers grooves 31 extending generally in axial orientation, both the at least one circumferential groove 3 and the plurality of transvers grooves 31 opening to the contact face 21. The at least one circumferential groove 3 and the plurality of transverse grooves 31 delimiting a plurality of contact elements 4. The tread 1 comprises a center region 22 containing the center line C-C' and a pair of shoulder regions 23 being positioned on two axial sides of the center region 22.

As shown in FIG. 1, the tread 1 is provide with at least one compressive contact element 5 among the plurality of contact elements 4, the compressive contact element 5 comprises a plurality of compressive elements 6. The plurality of compressive elements 6 is a plurality of holes 61 opening to the contact face 21 and extending in radially inward of the tread 1 (shown in FIG. 2). A width of one of the pair of shoulder regions 23 between an axial extremity of the tread 1 and the center of axially outermost circumferential groove 3 closest to the axial extremity of the tread 1 is from 10% to 25% of the width TW, and the compressive contact element 5 locates in at least one of the pair of shoulder regions 23. All the contact elements 4 in the pair of shoulder regions 23 are the compressive contact element 5. In the present embodiment, the width of one of the pair of shoulder regions 23 is 19% of the width TW, and a diameter of each the hole 61 as the compressive element 6 is 2.0 mm.

As shown in FIG. 2, the at least one of the compressive element 6 among the plurality of compressive elements 6 comprises an enlarged portion 63 at radially innermost portion of the compressive element 6. A radially innermost portion of the enlarged portion 63 locates at a level below radially innermost of the groove 3. As same as typical radial tire construction, a carcass 8 (or a casing), a main body of a tire which may or may not be provided with an inner liner for inhibiting loss or air pressure, and a ply 7 (or a belt), one or more rubber-coated layers of metallic or textile or other material in a form of cable or wire or strings, are provided radially inward of the tread 1. In the present embodiment, a width of each the enlarged portion 63 is 3.0 mm.

A volumetric void ratio of the at least one compressive contact element 5 in a unit region 51 surrounded by a center of the at least one circumferential groove 3 and a center of the plurality of transverse grooves 31 delimiting the compressive contact element 5 among the plurality of contact elements 4 is at least equal to 25%, and an aspect ratio defined as a ratio of a surface of the compressive contact element 5 supposed to contact with ground divided by a sum of a surface area of the compressive contact element 5 touching with air other than the surface of the compressive contact element 5 supposed to contact with ground is at most equal to 70%. In the present embodiment, the volumetric void ratio is 34%, and the aspect ratio is 30%.

An average of the volumetric void ratio of the plurality of contact elements 4 including the compressive contact element 5 at one of the pair of shoulder regions 23 is at least equal to 25%, and an average of the aspect ratio of the plurality of contact elements 4 including the compressive contact element 5 at one of the pair of shoulder regions 23 is at most equal to 70%.

Since the tread 1 is provided with at least one compressive contact element 5 comprising the plurality of compressive elements 6 among the plurality of contact elements 4, such the compressive contact element 5 can absorb deformation due to Poisson's effect and limit stiffening due to incompressibility of rubber material constituting the tread 1 thanks to the plurality of compressive elements 6. Therefore it is possible to improve noise performance.

Since the volumetric void ratio of the at least one compressive contact element 5 in a unit region 51 surrounded by a center of the at least one circumferential groove 3 and a center of the plurality of transverse grooves 31 delimiting the compressive contact element 5 among the plurality of contact elements 4 is at least equal to 25%, the compressive contact element 5 can ensure enough void to absorb deformation due to Poisson's effect. Therefore it is possible to improve effectively noise performance.

If the volumetric void ratio of the at least one compressive contact element 5 in the unit region 51 is less than 25%, there is a risk that the compressive contact element 5 cannot ensure enough void to absorb deformation due to Poisson's effect thus stiffening finally the contact element 4 leading insufficient improvement on noise performance. By setting this volumetric void ratio of the at least one compressive contact element 5 in the unit region 51 at least equal to 25%, it is possible to improve effectively noise performance.

This volumetric void ratio of the at least one compressive contact element 5 in the unit region 51 is preferably at least equal to 28%, more preferably at least equal to 30%.

Since the aspect ratio defined as the ratio of the surface of the compressive contact element 5 supposed to contact with ground divided by the sum of the surface area of the compressive contact element 5 touching with air other than the surface of the compressive contact element 5 supposed to contact with ground is at most equal to 70%, the compressive contact element 5 can limit structural stiffening of the tread. Therefore it is possible to improve effectively noise performance.

If this aspect ratio is more than 70%, there is a risk that the compressive contact element 5 cannot limit structural stiffening of the tread 1 thus stiffening finally the contact element 4 leading insufficient improvement on noise performance. By setting this aspect ratio at most equal to 70%, it is possible to improve effectively noise performance.

This aspect ratio is preferably at most equal to 60%, more preferably at most equal to 50% and still more preferably at most equal to 40%.

Since the width of one of the pair of shoulder regions 23 between an axial extremity of the tread 1 and the center of axially outermost circumferential groove 3 closest to the axial extremity of the tread 1 is from 10% to 25% of the width TW, the compressive contact element 5 locates in at least one of the pair of shoulder regions 23, it is possible to improve noise performance while maintaining reasonable level on handling performance.

If the width of one of the pair of shoulder regions 23 is less than 10% of the width TW, there is a risk that a volume of the compressive contact element 5 available on the tread 1 becomes insufficient thus insufficient improvement on noise performance. If the width of one of the pair of shoulder regions 23 is more than 25%, there is a risk that a volume of the compressive contact element 5 available on the tread 1 becomes too much thus degrading handling performance.

Since the average of the volumetric void ratio of the plurality of contact elements 4 including the compressive contact element 5 at one of the pair of shoulder regions 23 is at least equal to 25%, and an average of the aspect ratio of the plurality of contact elements 4 including the compressive contact element 5 at one of the pair of shoulder regions 23 is at most equal to 70%, it is possible to improve effectively noise performance while maintaining reasonable level on handling performance as one of the pair of shoulder regions 23 can get maximum benefit of the compressive contact element 5 available in the pair of shoulder regions 23.

Since all the contact elements 4 in the pair of shoulder regions 23 are the compressive contact element 5, it is possible to improve efficiently noise performance while maintaining reasonable level on handling performance as shoulder regions 23 can get full benefit of the compressive contact element 5 available in the shoulder regions 23.

Since the plurality of compressive elements 6 is a plurality of holes 61 opening to the contact face 21 and extending in radially inward of the tread 1, it is possible to improve efficiently noise performance while maintaining reasonable level on handling performance as the holes 61 can absorb efficiently deformation of the compressive contact element 5 due to Poisson's effect.

Since at least one of the compressive element 6 among the plurality of compressive elements 6 comprises an enlarged portion 63 at radially innermost portion of the compressive element 6, it is possible to improve efficiently noise performance while maintaining reasonable level on handling performance as the enlarged portion 63 can absorb efficiently deformation of the compressive contact element 5 due to Poisson's effect.

Since radially innermost of the enlarged portion 63 locates at a level below radially innermost of the groove 3, it is possible to improve efficiently noise performance while maintaining reasonable level on handling performance as the enlarged portion 63 can effectively support deformation of the compressive contact element 5.

The volumetric void ratio may be able to satisfy by using a foamed rubber composition. Preferably the rubber composition constituting the tread 1 is a non-foamed rubber composition.

The hole 61 as the compressive element 6 may extend in straight, curved or zig-zagged manner toward radially inward of the tread 1, with or without an angle relative to radial orientation.

The diameter or a depth of each the hole 61 may vary from one another, including with or without the enlarged portion 63. The shape of each the hole 61 on the contact face 21 may also vary from one another and may be any shape, for example circular, triangular, oblong or polygonal, or those may be the same within one compressive contact element 5.

A content of the compressive element 6 in one single compressive contact element 5 may vary from one compressive contact element 5 to another compressive contact element 5.

A tread 71 according to a second embodiment of the present disclosure will be described referring to FIGS. 3 and 4. FIG. 3 is a schematic plan view of a tread according to a second embodiment of the present disclosure. FIG. 4 is a schematic cross sectional view taken along line IV-IV in FIG. 3. The construction of this second embodiment is similar to that of the first embodiment other than the arrangement shown in FIGS. 3 and 4, thus description will be made referring to FIGS. 3 and 4.

As shown in FIG. 3, a tread 71 has a contact face 721 of a width TW (not shown), and at least one circumferential groove 73 of a depth D (shown in FIG. 4) extending in circumferential orientation and a plurality of transvers grooves 731 extending generally in axial orientation, both the at least one circumferential groove 73 and the plurality of transvers grooves 731 opening to the contact face 721. The at least one circumferential groove 73 and the plurality of transverse grooves 731 delimiting a plurality of contact elements 74. The tread 71 comprises a center region 722 and a pair of shoulder regions 723 being positioned on two axial sides of the center region 722.

As shown in FIG. 3, the tread 71 is provided with at least one compressive contact element 75 among the plurality of contact elements 74. The compressive contact element 75 comprises a plurality of compressive elements 76. The plurality of compressive elements 76 is a plurality of incisions 62 opening to the contact face 721 and extending in an orientation having non-zero angle with axial orientation of the tread 71. In the present embodiment, the non-zero angle is 90 degrees, and a width of each the incision 62 is 1.5 mm.

As shown in FIG. 4, some of the incisions 62 as the compressive elements 76 are comprise an enlarged portion 763 at radially innermost portion of the compressive element 76. A radially innermost of some of the incisions 62 or the enlarged portions 763 locates at a level below radially innermost of the groove 73. In the present embodiment, a width of the enlarged portion 763 is 3.0 mm.

As shown in FIG. 4, the pair of shoulder regions 723 each comprises a shoulder rubber layer 25 of a thickness ts made of a shoulder rubber composition different from a rubber composition constituting the tread 71, and a shear storage modulus G' of the shoulder rubber composition is less than or equal to 2.0 MPa. In the present embodiment, the shear storage modulus G' of the shoulder rubber composition is 0.4 MPa, and a shear storage modulus G' of the rubber composition constituting the tread 71 is 2.3 MPa.

A volumetric void ratio of the at least one compressive contact element 75 in a unit region 751 surrounded by a center of the at least one circumferential groove 73 and a center of the plurality of transverse grooves 731 delimiting the compressive contact element 75 among the plurality of contact elements 74 is at least equal to 25%, and an aspect ratio defined as a ratio of a surface of the compressive contact element 75 supposed to contact with ground divided by a sum of a surface area of the compressive contact element 75 touching with air other than the surface of the compressive contact element 75 supposed to contact with ground is at most equal to 70%. In the present embodiment, the volumetric void ratio is 34%, and the aspect ratio is 30%.

Since the plurality of compressive elements 76 is a plurality of incisions 62 opening to the contact face 721 and extending in an orientation having non-zero angle with axial orientation of the tread 71, it is possible to improve noise performance in particular exterior noise performance as the incisions 62 are not open directly to exterior of the tread 71.

The non-zero angle of the incisions 62 relative to axial orientation of the tread 71 is preferably more than 30 degrees, more preferably more than 45 degrees and still more preferably more than 60 degrees.

Since the pair of shoulder regions 723 each comprising a shoulder rubber layer 25 of a thickness ts made of a shoulder rubber composition different from a rubber composition constituting the tread 71, and a shear storage modulus G' of the shoulder rubber composition is less than or equal to 2.0 MPa, it is possible to improve noise performance while maintaining reasonable level on handling performance since the shoulder rubber layer 25 is comprised in the pair of shoulder regions 723 and not the center region 722, degradation on handling performance is limited as the center region 722 has a dominant impact on handling performance due to longer contact length compared to shoulder regions 723, and the shoulder rubber layer 25 can effectively reduce excitation of the tread 71 during rolling thanks to the shoulder rubber composition having the shear storage modulus G' smaller than the shear storage modulus G' of the rubber composition constituting the tread 71.

Since the shear storage modulus G' of the shoulder rubber composition is less than or equal to 2.0 MPa, the shoulder rubber layer 25 can effectively reduce excitation of the tread 71 during rolling.

If the shear storage modulus G' of the shoulder rubber composition is more than 2.0 MPa, there is a risk that an improvement on noise performance would be insufficient.

The width, the depth of the incision 62 with or without enlarged portion 763 may vary from one another, or may be the same within one compressive contact element 75.

The shoulder rubber layer 25 may be invisible on the contact face 721 when the tread 71 being brand new. The shoulder rubber layer 25 may be provided radially below a level of 50% of the depth D of the at least one groove 73.

The center region may comprise a center rubber layer of a thickness tf made of a center rubber composition different from both the shoulder rubber composition and the rubber composition constituting the tread 71, and a shear storage modulus G' of the center rubber composition may be higher than the shear storage modulus G' of the rubber composition constituting the tread 71. The thickness tf of the center rubber layer may be thinner than the thickness ts of the shoulder rubber layer 25.

In case the center region comprises the center rubber layer, the shear storage modulus G' of the center rubber composition is preferably from 2 to 10 times of the rubber composition constituting the tread 71 for handling performance improvement, as if the shear storage modulus G' of the center rubber composition is less than 2 times of the shear storage modulus G' of the rubber composition constituting the tread 71, there is a risk that improvement on handling performance becomes insufficient due to relatively insufficient modulus of the center rubber composition, and if the shear storage modulus G' of the center rubber composition is more than 10 times of the shear storage modulus G' of the rubber composition constituting the tread 71, there is a risk that improvement on handling performance becomes insufficient either as too hard center rubber composition may make flattening of the tire difficult which leads contact patch length shorter resulting generating less lateral force.

The shear storage modulus G' of the rubber composition constituting the tread 71 other than the center rubber layer or the shoulder rubber layer 25 may be less than or equal to 6.0 MPa for noise performance improvement while improving or at least maintaining reasonable level on handling performance, as if the shear storage modulus G' of the rubber composition constituting the tread 71 other than the center rubber layer or the shoulder rubber layer 25 is more than 6.0 MPa, there is a risk that improvement on noise performance becomes insufficient, as the tread 71 itself becomes too hard even provided with the shoulder rubber layer 25. The shear storage modulus G' of the rubber composition constituting the tread 71 other than the center rubber layer or the shoulder rubber layer 25 is preferably less than or equal to 4.0 MPa, more preferably less than or equal to 3.0 MPa.

The disclosure is not limited to the examples described and represented and various modifications can be made there without leaving its framework.

FIG. 5 is a schematic plan view of a tread according to prior art. A tread 101 has a contact face 1021, at least one circumferential groove 103 and a plurality of transverse grooves 1031 both opening to the contact face 1021. The at least one circumferential groove 103 and the plurality of transverse grooves 1031 delimiting a plurality of contact elements 104. A unit region 1051 is defined as a region surrounded by a center of the at least one circumferential groove 103 and a center of the plurality of transverse groove 1031 delimiting the contact element 104. In this prior art, a volumetric void ratio of the contact element 104 in the unit region 1051 is 17%, an aspect ratio defined as a ratio of a surface of the contact element 104 supposed to contact with ground divided by a sum of a surface area of the contact element 104 touching with air other than the surface of the contact element 104 supposed to contact with ground is 130%.

FIG. 6 is a schematic plan view of a tread according to another prior art. A tread 201 has a contact face 2021, at least one circumferential groove 203 and a plurality of transverse grooves 2031 both opening to the contact face 2021. The at least one circumferential groove 203 and the plurality of transverse grooves 2031 delimiting a plurality of contact elements 204. In an axially outermost region of the tread 201, a plurality of incisions 2062 is provided without the plurality of transverse grooves 2031. In this prior art, a volumetric void ratio of the contact element 204 at the axially outermost region of the tread 201 is 17%, an aspect ratio defined as a ratio of a surface of the axially outermost region of the tread 201 supposed to contact with ground divided by a sum of a surface area of the axially outermost region of the tread 201 touching with air other than the surface of the axially outermost region of the tread 201 supposed to contact with ground is 50%.

EXAMPLES

In order to confirm the effect of the present disclosure, one type of tire of Example to which the present disclosure is applied and other types of tire of Reference and Comparative Example were prepared.

The Example was a tire provided with a tread as described in the above first embodiment: a width of one shoulder region was 25% of a width of the tread TW, a shear storage modulus G' of a rubber composition constituting the tread was 2.3 MPa. The volumetric void ratio of the compressive contact element was 34%, the aspect ratio of the compressive contact element was 30%. The Reference was a tire provided with a tread as shown in FIG. 5. The Comparative Example was a tire provided with a tread as shown in FIG. 6.

Noise Performance Test:

Unused test tires were mounted onto all four wheels of a 2,500 cc rear-wheel drive vehicle. On a straight path weathered asphalt, the vehicle was driven at a constant speed of 80 kph. An interior noise was measured using a microphone positioned at a passenger's ear close to window. An A-weighted sound pressure level between 0 and 500 Hz was calculated.

The results are shown in table 1. In this table 1, results are represented by difference in dB (A) against Reference, lower the value indicates better the performance. Improvement of more than 0.3 dB (A) could be considered as "improvement". Handling test:

A cornering power of unused test tires mounted onto a standard rim and inflated to nominal internal pressure was measured using a flat belt tire tester. A load of 460 kg was applied while tires driven at a constant speed of 80 kph, lateral force at a slip angle ±1° was measured, and the lateral forces measured at +1° and at −1° in absolute value were averaged.

The results are also shown in table 1. In this table 1, results are represented by an index of 100 for Reference, higher the number indicates better the performance. Within 3 points difference on this comparison could be considered as reasonable.

TABLE 1

|  | Example 1 | Comparative Example 1 | Reference 1 |
|---|---|---|---|
| Volumetric void ratio (%) | 34 | 17 | 17 |
| Aspect ratio (%) | 30 | 50 | 130 |
| G' of tread rubber (MPa) | 2.3 | 2.3 | 2.3 |
| Noise performance (dBA) | −1.0 | −0.2 | 0.0 |
| Handling performance (index) | 99 | 102 | 100 |

The same comparisons were made by changing tire internal construction as to have the shoulder rubber layer as shown in FIG. 4 with 2 kinds of G' for the shoulder rubber composition. The results are shown in tables 2 and 3.

TABLE 2

|  | Example 2 | Comparative Example 2 | Reference 2 |
|---|---|---|---|
| Volumetric void ratio (%) | 34 | 17 | 17 |
| Aspect ratio (%) | 30 | 50 | 130 |
| G' of tread rubber (MPa) | 2.3 | 2.3 | 2.3 |
| G' of shoulder rubber (MPa) | 0.15 | 0.15 | 0.15 |
| Noise performance (dBA) | −0.5 | 0.0 | 0.0 |
| Handling performance (index) | 101 | 100 | 100 |

TABLE 3

|  | Example 3 | Comparative Example 3 | Reference 3 |
|---|---|---|---|
| Volumetric void ratio (%) | 34 | 17 | 17 |
| Aspect ratio (%) | 30 | 50 | 130 |
| G' of tread rubber (MPa) | 2.3 | 2.3 | 2.3 |
| G' of shoulder rubber (MPa) | 0.4 | 0.4 | 0.4 |
| Noise performance (dBA) | −0.5 | −0.2 | 0.0 |
| Handling performance (index) | 99 | 100 | 100 |

As seen from tables 1 to 3, the Examples show improvement on noise performance while improving or maintaining reasonable level on handling performance, which cannot be achieved by treads disclosed in prior arts.

REFERENCE SIGNS LIST 1, 71 tread
21, 721 contact face
22, 722 center region
23, 723 shoulder region
25 shoulder rubber layer
3, 73 groove
31,731 transverse groove
4, 74 contact element
5, 75 compressive contact element
51, 751 unit region
6, 76 compressive element
61 hole
62 incision
63.763 enlarged portion
7, 77 ply
8, 78 carcass ply

What is claimed is:

1. A tread for a tire having:
a contact face of a width TW intended to come into contact with ground during rolling, the tread being provided with at least one circumferential groove of a depth D extending in a circumferential orientation and a plurality of transverse grooves extending generally in an axial orientation, both the at least one circumferential groove and the plurality of transverse grooves opening to the contact face, the at least one circumferential groove and the plurality of transverse grooves delimiting a plurality of contact elements,
the tread comprising a center region and a pair of shoulder regions being positioned on two axial sides of the center region, each of the center region and the shoulder regions having a plurality of contact elements,
the plurality of contact elements including a plurality of compressive contact elements that have compressive elements, the compressive elements only being present in the shoulder regions of the tread,
wherein for each of the compressive contact elements, a volumetric void ratio in a unit region surrounded by a center of the at least one circumferential groove and a center of the plurality of transverse grooves delimiting the respective compressive contact element is at least equal to 30%, and an aspect ratio defined as a ratio of a surface of the respective compressive contact element supposed to contact with ground divided by a sum of a surface area of the respective compressive contact element touching with air other than the surface of the respective compressive contact element supposed to contact with ground being at most equal to 70%,
wherein at least one of the compressive elements among the plurality of compressive elements comprises an enlarged portion at radially innermost portion of the compressive element, and
wherein each of the compressive elements extends only in a circumferential direction and extends from one circumferential side of a respective one of the compressive contact elements to an opposite circumferential side.

2. The tread according to claim 1, wherein a width of one of the pair of shoulder regions between an axial extremity of the tread and the center of an axially outermost circumferential groove closest to the axial extremity of the tread is from 10% to 25% of the width TW, and wherein the compressive contact element locates in at least one of the pair of shoulder regions.

3. The tread according to claim 2, wherein an average of the volumetric void ratio of the plurality of contact elements including the compressive contact element at one of the pair of shoulder regions is at least equal to 25%, and wherein an average of the aspect ratio of the plurality of contact elements including the compressive contact element at one of the pair of shoulder regions is at most equal to 70%.

4. The tread according to claim 2, wherein all the contact elements in the pair of shoulder regions are the compressive contact element.

5. The tread according to claim 1, wherein the plurality of compressive elements is a plurality of incisions opening to the contact face and extending in an orientation having a non-zero angle with the axial orientation of the tread.

6. The tread according to claim 1, wherein radially innermost of the enlarged portion locates at a level below radially innermost of the at least one circumferential groove.

7. The tread according to claim 1, wherein the pair of shoulder regions each comprises a shoulder rubber layer of a thickness ts made of a shoulder rubber composition different from a rubber composition constituting the tread, and wherein a shear storage modulus G' of the shoulder rubber composition is smaller than a shear storage modulus G' of the rubber composition constituting the tread.

8. The tread according to claim 7, wherein the shear storage modulus G' of the shoulder rubber composition is less than or equal to 2.0 MPa.

9. The tread according to claim 1, wherein the compressive elements are the only depressions formed into an upper surface of the compressive contact elements.

\* \* \* \* \*